United States Patent
Bardy

(10) Patent No.: US 9,548,778 B2
(45) Date of Patent: Jan. 17, 2017

(54) DEVICE AND METHOD FOR SWITCHABLY ROUTING DOWN-CONVERTED RF SIGNALS

(71) Applicant: NXP B.V., Eindhoven (NL)

(72) Inventor: Serge Bardy, Caen (FR)

(73) Assignee: NXP B.V., Eindhoven (NL)

( * ) Notice: Subject to any disclaimer, the term of this patent is extended or adjusted under 35 U.S.C. 154(b) by 0 days.

(21) Appl. No.: 14/857,660

(22) Filed: Sep. 17, 2015

(65) Prior Publication Data
US 2016/0087665 A1 Mar. 24, 2016

(30) Foreign Application Priority Data

Sep. 19, 2014 (EP) .................................. 14290280

(51) Int. Cl.
| | | |
|---|---|---|
| *H04B 1/18* | (2006.01) | |
| *H04B 1/00* | (2006.01) | |
| *H04H 40/90* | (2008.01) | |
| *H01P 1/10* | (2006.01) | |

(52) U.S. Cl.
CPC ............... *H04B 1/18* (2013.01); *H04B 1/006* (2013.01); *H04H 40/90* (2013.01); *H01P 1/10* (2013.01)

(58) Field of Classification Search
CPC ... H04B 1/18; H04B 7/18526; H04B 7/18563; H04B 7/18591; H04B 7/2046; H04H 40/90
USPC ....................................................... 455/280
See application file for complete search history.

(56) References Cited

U.S. PATENT DOCUMENTS

| | | | | |
|---|---|---|---|---|
| 4,495,498 A | | 1/1985 | Petrelis et al. | |
| 5,220,320 A | * | 6/1993 | Assal ................... | H04B 7/2046 340/2.21 |
| 5,774,698 A | * | 6/1998 | Olnowich ............. | H04L 7/0338 370/366 |
| 5,924,031 A | * | 7/1999 | Copeland ............. | H04B 7/2041 455/12.1 |
| 5,949,778 A | * | 9/1999 | Abu-Amara ........ | H04L 12/5601 370/388 |
| 6,064,127 A | * | 5/2000 | Vaillant .............. | H04Q 11/0005 307/113 |
| 7,031,653 B1 | * | 4/2006 | Turley ............... | H04B 7/18515 370/316 |

(Continued)

OTHER PUBLICATIONS

Dow-Key Microwave Corp; "CANbus-Controlled Switch Matrices"; Microwave Journal; retrieved from the internet Dec. 10, 2014 http://www.microwavejournal.com/articles/3028-canbus-controlled-switch-matrices ; 2 pages (Sep. 1, 2000).

(Continued)

*Primary Examiner* — Simon Nguyen

(57) ABSTRACT

A device for switchably routing down-converted radio frequency (RF) signals from a plurality of inputs to a plurality of outputs, and a method of operating the same. The device includes a respective switch for each output. The device also includes an interconnect arrangement. The interconnect arrangement includes a respective transmission line for each input. Each transmission line includes a plurality of branches for routing a down-converted RF signal received at the input of that transmission line to the switch of each output. The switch of each output is operable selectively to connect one of the transmission lines to its output. The interconnect arrangement also includes a plurality of crossover points at which two of the branches cross over each other.

15 Claims, 4 Drawing Sheets

(56) References Cited

U.S. PATENT DOCUMENTS

| | | | | |
|---|---|---|---|---|
| 7,215,854 B2* | 5/2007 | Telkamp | ............ | G02B 6/12002 |
| | | | | 216/24 |
| 7,369,810 B2* | 5/2008 | Sichi | ................. | H04B 7/18515 |
| | | | | 333/101 |
| 7,792,486 B2* | 9/2010 | Petruzzelli | ............. | H04H 40/90 |
| | | | | 348/731 |
| 9,166,638 B2* | 10/2015 | Kan | ....................... | H04B 1/123 |
| 2005/0058128 A1* | 3/2005 | Carson | ...................... | G06T 7/20 |
| | | | | 370/388 |
| 2007/0241837 A1 | 10/2007 | Kamitsuna | | |
| 2010/0272441 A1* | 10/2010 | Boduch | .............. | H04J 14/0206 |
| | | | | 398/83 |
| 2012/0321241 A1* | 12/2012 | Julien | .................... | G02F 1/313 |
| | | | | 385/3 |

OTHER PUBLICATIONS

Extended European Search Report for application 14290280.8 (Jan. 7, 2015).

* cited by examiner

DEVICE AND METHOD FOR SWITCHABLY ROUTING DOWN-CONVERTED RF SIGNALS

CROSS-REFERENCE TO RELATED APPLICATIONS

This application claims the priority under 35 U.S.C. §119 of European patent application no. 14290280.8, filed on Sep. 19, 2014, the contents of which are incorporated by reference herein.

FIELD OF THE INVENTION

This invention relates to a device and method for switchably routing down-converted RF signals.

BACKGROUND OF THE INVENTION

Low-noise block down-converters (LNBs) are devices that may be used for satellite TV reception. Typically, they are mounted on a satellite dish for down-converting the received radio frequency (RF) signals. LNBs typically may include features such as a low-noise amplifier, a frequency mixer, a local oscillator and an intermediate frequency (IF) amplifier.

One example of a LNB is a quad LNB. A quad LNB has a single feed-horn that has four outputs that are connected to four different tuners. Each output responds to the tuners band and polarisation selection signals independently of the other outputs, and each output appears to the tuner to be a separate LNB. In devices of this kind, and also in other kinds of devices where it is necessary to selectively switch between different down-converted signals, it is known to provide a switch matrix of the kind shown in FIGS. 1 and 2.

The switch matrix 2 shown in FIG. 1 includes eight transmission lines 16, 18. The transmission lines 18 are each connected to inputs 4, while transmission lines 16 are each connected to outputs 6. The transmission lines 16, 18 are arranged in a grid or matrix and are provided with shunt switches 8 which can be opened or closed selectively to connect the transmission lines of the inputs 4 to the transmission lines of the outputs 6. In this way, each output can selectively output the down-converted RF signal received at any one of the inputs 4.

A key requirement for down-converters that are used in, for example, satellite TV reception is that the receive channel for each tuner is not polluted by the other channels and/or is not influenced by the channels selected by any of the other tuners of the system. With reference to FIG. 1, it is therefore beneficial if the transmission lines 16, 18 of the switch matrix 2 are well isolated from each other, specifically when they are not connected together by one of the shunt switches 8. However, it can be seen from FIG. 1 that the transmission lines 16 of the outputs 6 cross over the transmission lines 18 of the inputs 4 in a number of places, corresponding to the locations of the shunt switches 8. Each cross-over point can degrade isolation performance of the device due to capacitive and/or magnetic coupling between the transition lines 16, 18. The number of cross-over points that are relevant to the degree of isolation between the transmission lines 16, 18 for a switch matrix 2 of the kind shown in FIG. 1 is influenced by the switching configuration of the matrix. This is explained below in FIGS. 2A-2D.

In each of FIGS. 2A-2D, the configuration or state of the shunt switches 8 is indicated as being either closed (see the dots labelled 12) or open (see the crosses labelled 14).

In the example of FIG. 2A, the shunt switches are configured such that each output 6 is connected to a different input 4. The transmission line 16 connected to each respective output 6 in this example crosses over three of the transmission lines 18. Also, the transmission line 18 connected to each output 6 (through a closed shunt switch 12) itself crosses over three of the transmission lines 16. Therefore, a total of six cross-over points contribute to unwanted coupling that may adversely affect the signal at each output 6.

In FIG. 2B, two of the outputs are connected to a first common one of the inputs, while two of the outputs are connected to a second common input. The transmission lines 16 connected to the top two outputs in FIG. 2B both cross over three of the transmission lines 18 and are connected together via the transmission line 18 connected to the first common input, which itself crosses over the two other transmission lines 16. Similarly, the transmission lines 16 connected to the bottom two outputs in FIG. 2B both cross over three of the transmission lines 18 and are connected together via the transmission line 18 connected to the second common input, which itself crosses over the two other transmission lines 16. In this example therefore, a total of eight cross-over points contribute to unwanted coupling that may adversely affect the signal at each output 6. The amount of unwanted coupling between the transmission lines 16, 18 in this switching state may therefore be higher than in the switching state shown in FIG. 2A.

In FIG. 2C, three of the outputs are connected to a first common input while the fourth output is connected to a different input. The transmission lines 16 connected to the top three outputs in FIG. 2C each cross over three of the transmission lines 18 and are connected together via the transmission line 18 connected to the first common input, which itself crosses over one of the other transmission lines 16. Accordingly, a total of ten cross-over points contribute to unwanted coupling that may adversely affect the signal at these three outputs 6. The transmission line 16 connected the fourth output 6 in this example crosses over three of the transmission lines 18. Also, the transmission line 18 connected to the fourth output 6 (through a closed shunt switch 12) itself crosses over three of the transmission lines 16. Therefore, a total of six cross-over points contribute to unwanted coupling that may adversely affect the signal at the fourth output 6. The amount of unwanted coupling between the transmission lines 16, 18 in this switching state may therefore be higher than in the switching states shown in FIGS. 2A and 2B. Note that each output also experiences a different amount of unwanted coupling.

In the example of FIG. 2D, all of the outputs are connected to the same common input. The transmission lines 16 connected to all four outputs in FIG. 2D each cross over three of the transmission lines 18 and are connected together via the transmission line 18 connected to the common input. Accordingly, a total of twelve cross-over points contribute to unwanted coupling that may adversely affect the signal at each output 6. The amount of unwanted coupling between the transmission lines 16, 18 in this switching state may therefore be higher than in the switching states shown in any of FIGS. 2A to 2C.

To summarise, when using a switch matrix 2 of the kind shown in FIGS. 1 and 2, the amount of unwanted coupling between the transmission lines is dependent upon the switching state of the matrix 2. In some switching states, the amount of coupling between the transmission lines 16, 18 can be high. Also, in some switching states, some ports may experience a different amount of unwanted coupling than the other ports. Because the loading conditions presented to the output ports of the switch matrix 2 is dependent upon the switching state of the matrix, switch matrices of the kind shown in FIGS. 1 and 2 are rarely used in radio frequency (RF) designs.

SUMMARY OF THE INVENTION

Aspects of the invention are set out in the accompanying independent and dependent claims. Combinations of features from the dependent claims may be combined with features of the independent claims as appropriate and not merely as explicitly set out in the claims.

According to an aspect of the invention, there is provided a device for switchably routing down-converted radio frequency (RF) signals from a plurality of inputs to a plurality of outputs. The device includes a respective switch for each output. The device also includes an interconnect arrangement. The interconnect arrangement includes a respective transmission line for each input. Each transmission line includes a plurality of branches for routing a down-converted RF signal received at the input of that transmission line to the switch of each output. The switch of each output is operable selectively to connect one of the transmission lines to its output. The interconnect arrangement also includes a plurality of cross-over points at which two of the branches cross over each other.

A device according to embodiments of this invention may provide switchable routing of down-converted radio frequency (RF) signals in a manner that reduces the overall number of cross-over points and/or in a manner that allows the number of cross over points affecting unwanted coupling (e.g. magnetic and/or capacitive coupling) between transmission lines to be made independent of a switch state of the device. This may be achieved by providing a transmission line for each input, each transmission line having branches for routing an input signal to a switch of each output, where switch of each output is operable selectively to connect one of the branches of the transmission lines to its output. As the number of cross over points may be reduced and/or made independent of the switch state of the device, the isolation performance of the device may be enhanced.

In accordance with embodiments of this invention, it has been realised that by arranging the transmission lines so that an interconnect arrangement has one or more axes of symmetry, the number of cross-over points of the interconnect arrangement can be further reduced.

The interconnect arrangement may have a first axis of symmetry about which a layout of the transmission lines is symmetrical. This may allow the number of cross-over points to be reduced compared to a device having no such axis of symmetry.

Each of the inputs may be located on a first side of the interconnect arrangement. Each of the outputs may be located on a second side of the interconnect arrangement. The first side may be opposite the second side. This arrangement of the inputs and outputs may allow the device to conform to certain layout requirements such as those associated with the pin layout of an integrated circuit. For instance, this arrangement of the inputs and outputs may allow connections between the inputs and outputs and their respective pins in an integrated circuit to be routed such that they do not cross over each other.

In one example, the inputs and outputs may be connected to respective pins of an integrated circuit, wherein the pins connected to inputs are located on a first side of the integrated circuit, wherein the pins connected to outputs are located on a second side of the integrated circuit, and wherein the first side is opposite the second side.

In one embodiment, the device may have four inputs (e.g. exactly four inputs) and four outputs (e.g. exactly four outputs). In one such embodiment, the branches of each transmission line may have seven (e.g. exactly seven) cross-over points.

The interconnect arrangement may have a second axis of symmetry about which a layout of the transmission lines is symmetrical. This may allow the number of cross-over points to be reduced compared to a device in which the interconnect arrangement has only one axis of symmetry or no axes of symmetry.

In one such embodiment, half of the inputs may be located on a first side of the interconnect arrangement, half of the inputs may be located on a second side of the interconnect arrangement, half of the outputs may be located on a third side of the interconnect arrangement and half of the outputs may be located on a fourth side of the interconnect arrangement. The first side may be opposite the second side and third side may be opposite the fourth side. A device in accordance with this embodiment may have four inputs and four outputs (e.g. exactly four inputs and exactly four outputs). The branches of each transmission line may have six (e.g. exactly six) cross-over points.

Each transmission line may have a plurality of branching points. Each branching point may be a point at which the transmission lines splits into two or more branches. In some embodiments such as those described above, each transmission line may have two or three branches (e.g. exactly two or exactly three).

The interconnect arrangement may be provided in a metallization stack on a semiconductor substrate.

According to another aspect of the invention, there is provided a method of switchably routing down-converted radio frequency (RF) signals. The method includes providing a device of the kind described above. The method also includes operating the switch of at least one output of the device to connect one of the transmission lines to said output.

In one embodiment, the method includes routing down-converted satellite television signals.

For the purposes of this application, radio frequency (RF) signals may be considered to be signals in the frequency range 4 GHz≤f≤40 GHz. For instance, the RF signals may be in one of the following IEEE bands: C band=4-8 GHz, $K_u$ band=12-18 GHz, $K_a$ band=26.5-40 GHz. It is noted that the down-converted signals routed according to a device and method of this invention may have a lower frequency than such RF signals. For instance, the down-converted signals may have frequencies in range 100 MHz≤f≤2 GHz (e.g. within the L-band=1-2 GHz).

BRIEF DESCRIPTION OF THE DRAWINGS

Embodiments of the present invention will be described hereinafter, by way of example only, with reference to the accompanying drawings in which like reference signs relate to like elements and in which.

DETAILED DESCRIPTION

Figure 1:
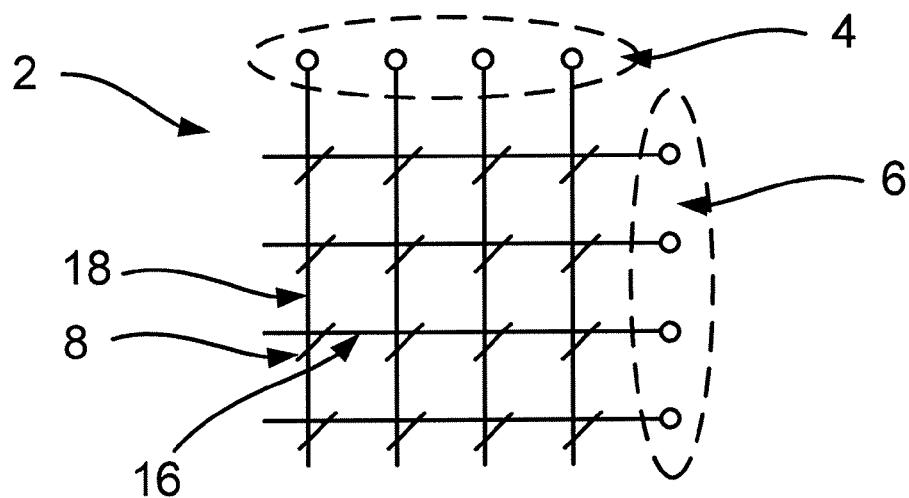
FIG. 1 shows a conventional rectangular switch matrix.
Figure 2A:
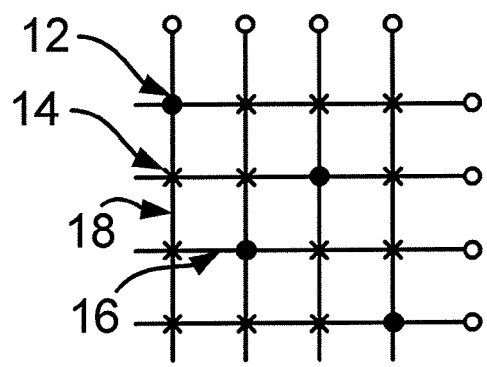
FIGS. 2A-2D show four different switch states of the conventional rectangular switch matrix of FIG. 1.
Figure 2B:
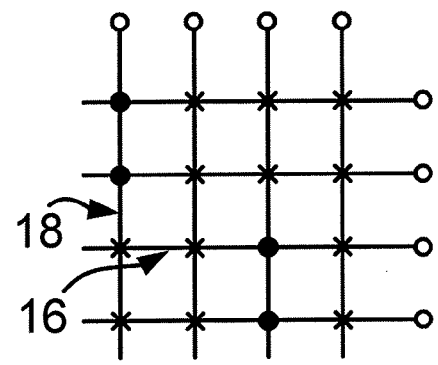
Figure 2C:
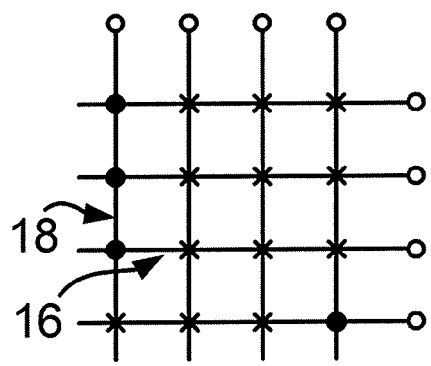
Figure 2D:
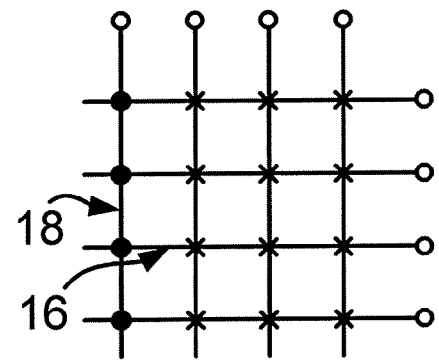

Embodiments of the present invention are described in the following with reference to the accompanying drawings.

Embodiments of this invention can provide a device for switchably routing down-converted radio frequency (RF) signals from a plurality of inputs to a plurality of outputs. In some embodiments, the RF signals may be satellite television signals. A device according to an embodiment of this invention may therefore find application in satellite TV reception and may, for instance, be incorporated into a low-noise down-converter that can be mounted on a satellite dish. It will be appreciated that the down-converted RF signals routed by a device according to an embodiment of this invention may typically have a frequency that is lower than the RE signals prior to down-conversion.

In the examples described herein, the device includes four inputs and four outputs. However, it is envisaged that the principles of operation described in relation to the invention may be applied also to devices having a different number of inputs and outputs.

In order to switchably route the down-converted signals, a device according to an embodiment of this invention includes a number of switches and an interconnect arrangement. In particular, a separate, respective switch may be provided for each output of the device. Each switch is operable selectively to connect to one of a plurality of transmission lines of the interconnect arrangement, where each transmission line routes a down-converted RF signal received by one of the inputs of the device. In this way, the switch at each output can choose between a down-converted signal received at any of the inputs of the device and this switching may be made independently of the switching state of the switches at the other outputs.

To route the down-converted signals from the inputs to the switches of the outputs, the interconnect arrangement provides a transmission line for each input, where each transmission line has a plurality of branches. Each branch routes the down-converted signal of the input associated with that transmission line to a respective one of the outputs.

The interconnect arrangement also has a number of cross-over points, which are points at which two of the branches of the transmission lines cross over each other. The number of cross-over points in the interconnect arrangement may, according to an embodiment of this invention, be reduced compared to a number of cross-over points in, for instance, a switch matrix of the kind described above. Moreover, a device according to an embodiment of this invention may allow the number of cross-over points that contribute to unwanted magnetic and/or capacitive coupling between the transmission lines to be made independent of the switching state of the device. This is again unlike the switch matrix described above, in which the number of cross-over points that contribute to unwanted coupling between the transmission lines is dependent upon the switching state of the matrix.

The overall number of cross-over points of the interconnect arrangement may be affected by factors such as the total number of inputs and outputs of the device, the locations of the inputs and outputs of the device and the number of axes of symmetry of the interconnect arrangement. This will be described in more detail below in relation to the embodiments of FIGS. 3-6.

Figure 3:
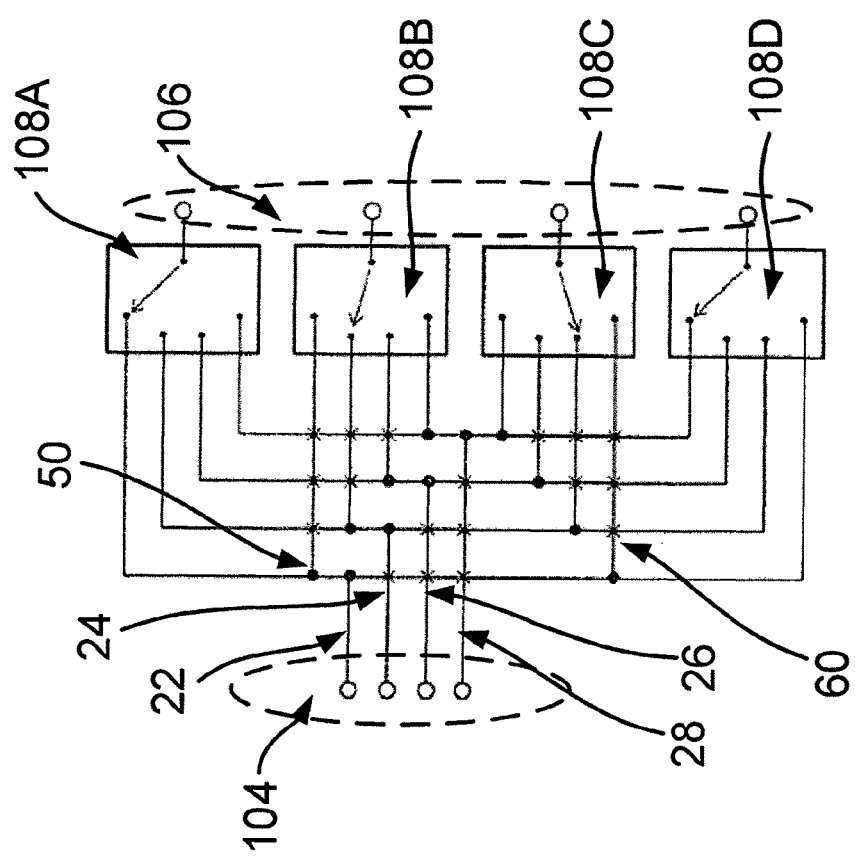

FIG. 3 shows a device for routing down-converted RF signals from a plurality of inputs to a plurality of outputs in accordance with a first embodiment of this invention. The device in FIG. 3 includes four inputs indicated generally at 104 and four outputs indicated generally at 106. As noted above, a different number of inputs and/or outputs may be provided.

The device also includes four transmission lines 22, 24, 26 and 28, one for each respective input 104. The transmission lines 22, 24, 26, 28 include a number of branches for routing a down-converted signal received at each respective input 104 to each of four switches 108A, 108B, 108C, 108D of the outputs 106. Each of the switches 108A, 108B, 108C, 108D is operable to selectively connect one of the branches of the four different transmission lines 22, 24, 26 and 28 that are routed to that switch to its respective output 106. In this way, each switch 108A, 108B, 108C, 108D can allow its respective output to receive a down-converted RF signal from any one of the four inputs 104, independent of the switching state of the other switches.

By way of example only, the switching state of the switches 108B and 108C shown in FIG. 3 select the transmission line 24, the switching state of the switch 108A selects the transmission line 22 and the switching state of the switch 108D selects transmission line 28.

The transmission lines 22, 24, 26, 28 in this embodiment (and also in the embodiments described below in relation to FIGS. 4-6) may be differential transmission lines, each including two parallel tracks as is well known in the art. For simplicity, these parallel tracks are not shown individually in the figures.

The interconnect arrangement in the example of FIG. 3 includes a number of cross-over points. These cross-over points are represented in FIG. 3 (and also in FIGS. 4-6) by the crosses labelled 60. Each cross-over point 60 is a point at which two branches of two separate transmission lines of the interconnect arrangement cross over each other. Also it is shown in FIG. 3 that each transmission line 22, 24, 26, 28 includes a number of branching points represented by the dots labelled 50. The branching points are points at which the transmission lines separate out into two or more branches. The branching out of the transmission lines 22, 24, 26, 28 allows the signal carried by each respective transmission line separately to be routed to the different switches 108A, 108B, 108C, 108D.

In the embodiment of FIG. 3, each transmission line 22, 24, 26, 28 includes three branching points 50 so that in total the interconnect arrangement has twelve branching points 50.

With reference to FIG. 3, it can be seen that there are a total of 18 cross-over points 60 in the interconnect arrangement. It can also be seen in FIG. 3 that the branches of each transmission line 22, 24, 26, 28 have nine cross-over points 60. Also, note that the number of cross-over points 60 is not dependent upon the switching state of the device. Thus, in the example of FIG. 3, each transmission line has nine cross-over points 60, irrespective of the switching state of the different switches 108A, 108B, 108C, 108D. Compared to at least some of the switching states of a switch matrix of the kind described above in relation to FIGS. 1 and 2, the amount of unwanted magnetic and/or capacitive coupling between the transmission lines may be reduced. Moreover, because the number of cross-over points is independent of the switching state of the device the amount of unwanted magnetic and/or capacitive coupling is predictable and constant. These factors make the embodiment of FIG. 3, as well as the further embodiments described below, particularly suitable for use in RF applications such as satellite TV reception.

The exact layout of the transmission lines 22, 24, 26, 28 in the embodiment of FIG. 3 may vary. For instance, the lengths of the transmission lines may vary according to the respective positions of the inputs 104 and the switches 108 and outputs 106 to which they are connected. It will be appreciated also by the skilled person that the exact layout of the transmission lines according to embodiments of this invention may vary according to design requirements. For instance, the embodiments described below in relation to FIGS. 4 and 5 both have the same number of cross-over points, although the exact layout of the transmission lines of the interconnect arrangements of those embodiments is different.

Figure 4:
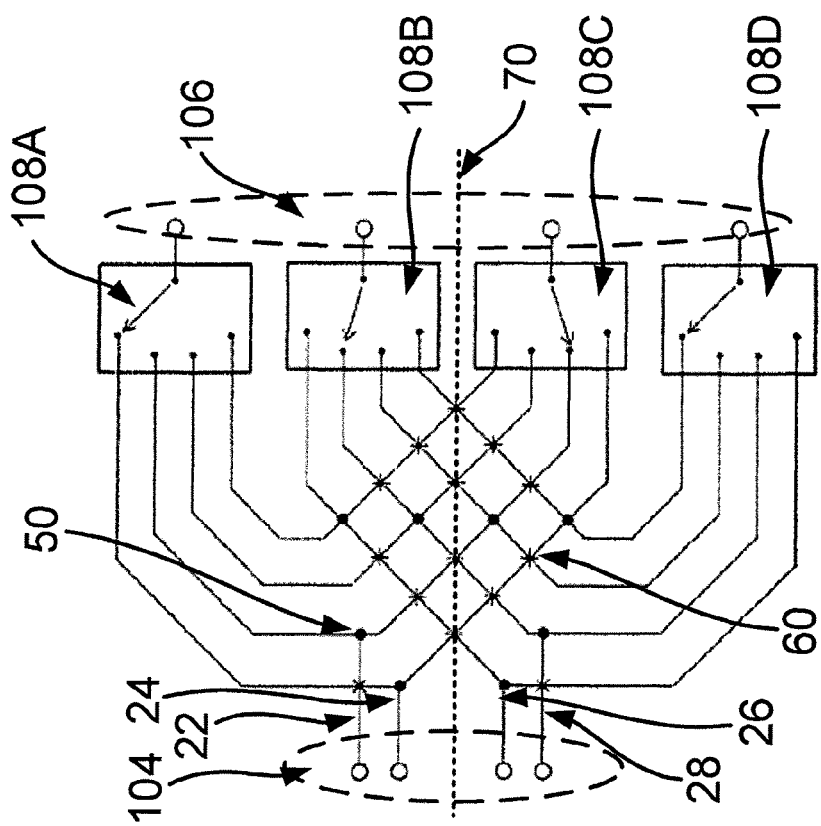
FIGS. 3-6 each show a device for switchably routing down-converted RF signals in accordance with an embodiment of the invention.

FIG. 4 shows a device for switchably routing down-converted RF signals from a plurality of inputs to a plurality of outputs in accordance with another embodiment of this invention. As described above in relation to FIG. 3, the device in FIG. 4 includes four inputs 104, four outputs 106, four switches 108A, 108B, 108C, 108D (one for each respective output 106) and four transmission lines 22, 24, 26, 28 having a plurality of cross-over points 60 and branching points 50.

The interconnect arrangement including the transmission lines 22, 24, 26, 28 of the embodiment of FIG. 4 has a layout that is different to that of the embodiment of FIG. 3. The interconnect arrangement has a first axis of symmetry indicated by the dotted line 70 in FIG. 4. The interconnect arrangement, including the transmission lines 22, 24, 26, 28 and the various branches thereof, plus the locations of the various cross-over points 60 and branching points 50 are symmetrical about the axis of symmetry 70.

In accordance with an embodiment of this invention, it has been realised that by providing an interconnect arrangement having an axis of symmetry, the overall number of cross-over points 60 associated with the routing of the transmission lines 22, 24, 26, 28 from the inputs 104 to the outputs 106 may be reduced. Compared with the interconnect arrangement in FIG. 3 (which does not have an axis of symmetry and in which, as noted above, the branches of each transmission line 22, 24, 26, 28 have nine cross-over points 60), the embodiment shown in FIG. 4, the branches of each transmission line 22, 24, 26, 28 have only seven cross-over points. This reduction in the number of cross-over points 60 can allow for a greater degree of isolation between the transmission lines 22, 24, 26, 28, since magnetic and/or capacitive coupling between the transmission lines 22, 24, 26, 28 may be reduced.

In the embodiment of FIG. 4, each transmission line 22, 24, 26, 28 includes two branching points 50 so that in total the interconnect arrangement has eight branching points 50.

Figure 5:
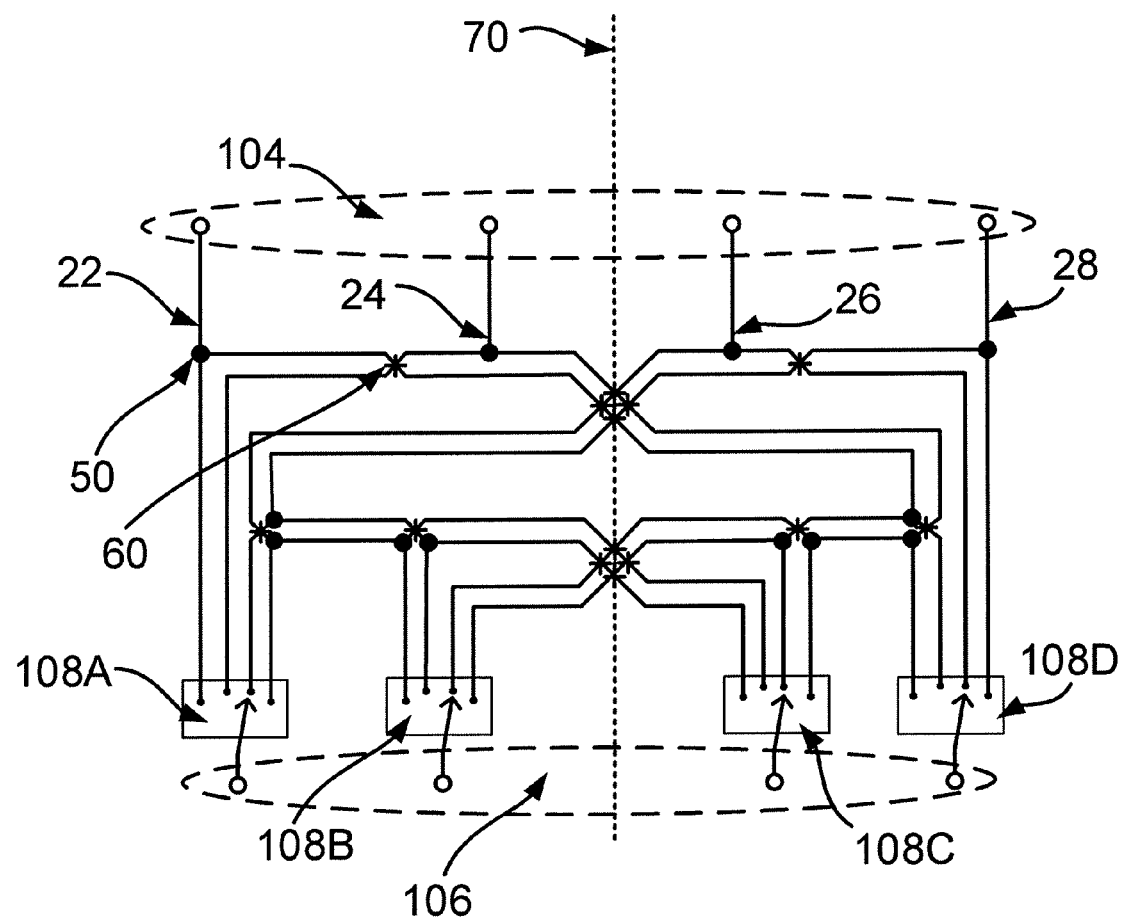

FIG. 5 shows a device for switchably routing down-converted RF signals from a plurality of inputs to a plurality of outputs in accordance with a further embodiment of this invention. As described above in relation to FIGS. 3 and 4, the embodiment of FIG. 5 includes four inputs 104, four outputs 106, four switches 108A, 108B, 108C, 108D (one for each respective output 106) and an interconnect arrangement that includes four transmission lines, 22, 24, 26, 28 (one for each respective input 104). Again, each transmission line 22, 24, 26, 28 includes a plurality of branches for routing a down-converted RF signal received at the input of that transmission line to each of the switches 108A, 108B, 108C, 108D. The switches 108A, 108B, 108C, 108D are operable selectively to connect one of the transmission lines 22, 24, 26, 28 to its output.

The embodiment in FIG. 5 has, in common with the embodiment of FIG. 4, an interconnect arrangement that has an axis of symmetry, which is represented in FIG. 5 by the dotted line labelled 70. As noted above, the exact layout of the transmission lines of a device in accordance with an embodiment of this invention may vary. It can be seen by a comparison of FIGS. 4 and 5 that the layout of the transmission lines of the interconnect arrangements are indeed different. Nevertheless, both embodiments of FIGS. 4 and 5 include the same number of cross-over points per transmission line. Thus, in common with the embodiment of FIG. 4, the branches of each transmission line 22, 24, 26, 28 in the embodiment of FIG. 5 have seven cross-over points. Again, these cross-over points are indicated by the crosses in FIG. 5 labelled 60.

In some interconnect arrangements, an increased number of branching points may give rise to more branches and/or longer transmission lines. The provision of longer transmission lines may adversely affect system performance, for instance by causing longer line delays, increasing losses and producing stronger magnetic coupling between the lines.

Note that although the number of cross-over points 60 in the embodiments of FIG. 4 and FIG. 5 is the same for each transmission line 22, 24, 26, 28, the embodiment of FIG. 5 has an interconnect arrangement that has more branching points 50 than the embodiment of FIG. 4. Each transmission line 22, 24, 26, 28 in the embodiment of FIG. 5 has three branching points 50. Thus, while the interconnect arrangement in FIG. 4 includes a total of eight branching points, the embodiment of FIG. 5 includes a total of twelve branching points 50. The transmission lines 22, 24, 26, 28 of the embodiment of FIG. 5 thus have a greater number of branches for routing the down-converted signals from the inputs 104 to the outputs 106.

In the embodiment of FIGS. 3, 4 and 5, the inputs 104 are all provided on a first side of the interconnect arrangement, while the outputs 106 are all provided on a second side of the interconnect arrangement. The first side is opposite the second side, such that the inputs 104 are provided on an opposite side of the interconnect arrangement to the output 106. The interconnect arrangement is provided in between the inputs 104 and the outputs 106. This arrangement can allow for convenient connection of the inputs 104 and outputs 104 to, for example, input and/or output pins of an integrated circuit upon which the device may be implemented.

For instance, this arrangement of the inputs and outputs may allow connections between the inputs 104 and outputs 106 and their respective pins in an integrated circuit to be routed such that they do not cross over each other. In one such example, the input pins of the integrated circuit may be provided on a first side of the chip, while the output pins of the integrated circuit may be provided on the opposite side of the chip. By situating the inputs and outputs in the manner shown in FIGS. 3-5, the inputs can be conveniently connected to the input pins of the integrated circuit and the outputs of the device can be conveniently connected to the output pins of the integrated circuit. It is also envisaged that some of the inputs/outputs in the embodiments of FIGS. 3-5 may be routed to pins on different sides of the integrated circuit, while still avoiding cross-overs in the connections. For example, the inputs 104 may be routed to pins on first, second and/or third sides of a four sided integrated circuit, while all of the outputs 106 may be routed to the fourth side.

Figure 6:
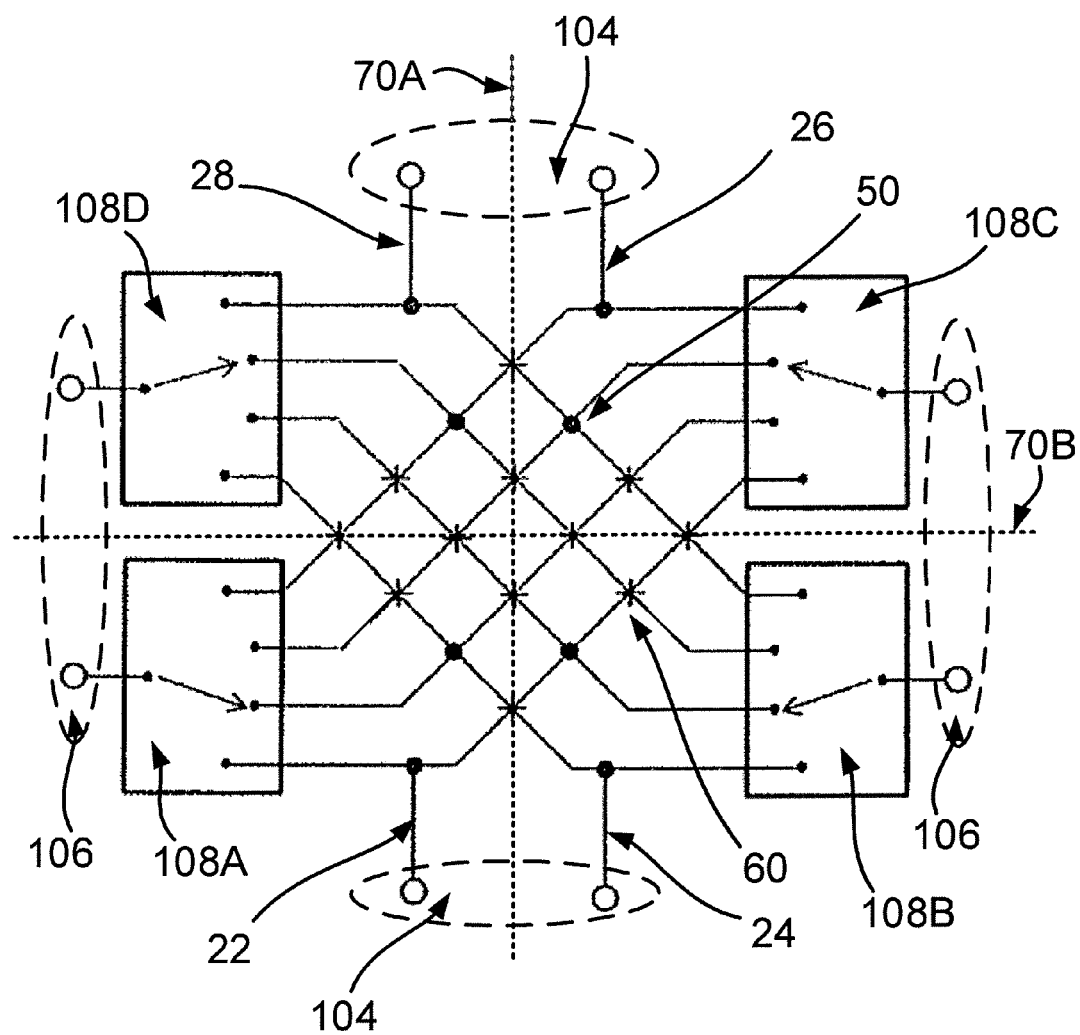

FIG. 6 shows a device for switchably routing down-converted RF signals from a plurality of inputs to a plurality of outputs in accordance with another embodiment of the invention.

In common with the embodiments described above in relation to FIGS. 3-5, the device in FIG. 6 includes four inputs 104, four outputs 106, four switches 108A, 108B, 108C, 108D (one for each output 106) and an interconnect arrangement that includes four transmission lines 22, 24, 26, 28. The interconnect arrangement also has a number of cross-over points 60 and the transmission lines 22, 24, 26, 28 further include branching points 50.

In the embodiment of FIG. 6, the interconnect arrangement has two axes of symmetry. In this example, these axes of symmetry are at 90° to each other. The axes of symmetry are indicated by the dotted lines labelled 70A and 70B in FIG. 6.

Unlike the embodiments described above in relation to FIGS. 3-5, the embodiment in FIG. 6 includes inputs 104 and outputs 106 that are located on different sides of the device. In particular, half of the inputs 104 are provided on a first side of the interconnect arrangement (at the top of the interconnect arrangement in the example of FIG. 6) and half of the inputs 104 are provided on a second side of the interconnect arrangement (at the bottom of the interconnect arrangement as shown in FIG. 6). Also, half of the outputs 106 are provided on a third side of the interconnect arrangement (on the left hand side of the interconnect arrangement shown in FIG. 6) and half of the outputs are located on a forth side of the interconnect arrangement (on the right hand side of the interconnect arrangement shown in FIG. 6). Accordingly, the inputs 104 of the device shown in FIG. 6 are provided on opposite sides of the interconnect arrangement and also the outputs 106 of the device shown in FIG. 6 are provided on opposite sides of the interconnect arrangement.

The separation of the inputs 104 and outputs 106 in this manner allows the interconnect arrangement to have two axes of symmetry 70A, 70B as noted above. Note that the embodiment of FIG. 6 may be used in situations where, for example, the locations of the inputs 104 and the outputs 106 is not necessarily dictated by the layout of other components in the system, such as the locations of the pins of an integrated circuit upon which the device may be implemented. For instance, owing to their locations, it may be more difficult (or simply not possible) to provide connections between the inputs 104 and outputs 106 in the embodiment of FIG. 6 and their respective pins in an integrated circuit without those connections crossing over each other. However, it is envisaged that in some instances, it may still be possible to do so and/or it may be the case that any coupling caused by these cross-overs may be tolerated.

In accordance with an embodiment of this invention, it has been found that the device having an interconnect arrangement having two axes of symmetry can have fewer cross-over points than an interconnect arrangement that has only one axis of symmetry or no axes of symmetry. For example, in FIG. 6, the branches of each transmission line 22, 24, 26, 28 have six cross-over points 60. Because the number of cross-over points 60 is further reduced, the isolation of the transmission lines 22, 24, 26, 28 may be further enhanced, since again magnetic and/or capacitive coupling between the transmission lines 22, 24, 26, 28 is reduced. Note that the embodiment of FIG. 6, in common with each of the embodiments described above in relation to FIGS. 3-5, also has a fixed number of cross-over points 60, irrespective of the switching state of the switches 108A, 108B, 108D. In the embodiment of FIG. 6, each transmission line 22, 24, 26, 28 includes two branching points 50 so that in total the interconnect arrangement has eight branching points 50.

As noted above, it is envisaged that a device according to an embodiment of this invention may be implemented on an integrated circuit. For instance, the interconnect arrangements described above may be implemented in a metallization stack on a semiconductor substrate. Metallization stacks are well known in the art, and include a plurality of metal layers including patterned metal features separated by dielectric layers. The patterning of the metal layers can be used to implement the layout of the transmission lines of the interconnect arrangements. Cross-over points can be implemented by routing the metal lines between different metal levels in the metallization stack.

Where the device is implemented in an integrated circuit, the integrated circuit may also include further features such as down-conversion stages including frequency mixers, local oscillators, intermediate frequency amplifiers and so forth. The down-conversion stages can be connected to the inputs 104 of the embodiments described above.

Alternatively, it is also envisaged that a device according to an embodiment of this invention may have an interconnect arrangement that it is provided as a discrete component that may be provided off-chip on, for example, a printed circuit board.

According to an embodiment of this invention, there can be provided a method of switchably routing down-converted RF signals. The method can include providing a device of the kind described above and operating one or more of the switches 108A, 108B, 108C, 108D to connect one of the transmission lines 22, 24, 26, 28 to the output 106 of that switch. In this way, each of the outputs can be configured selectively to receive the down-converted signal from any of the inputs of the device, independently of the switching state of the other switches of the device. As noted above, the interconnect arrangements of the devices of embodiments of this invention allow these down-converted signals to be routed in a manner that may reduce magnetic and/or capacitive coupling between the transmission lines and/or in a manner that makes the amount of unwanted coupling independent of the overall switching state of the device. Accordingly, the amount of coupling between the transmission lines may be fixed and/or predictable.

The method of switchably routing down-converted RF signals described herein may involve routing down-converted signals associated with satellite television signals received at, for example, a satellite dish.

Accordingly, there has been described a device for switchably routing down-converted radio frequency (RF) signals from a plurality of inputs to a plurality of outputs, and a method of operating the same. The device includes a respective switch for each output. The device also includes an interconnect arrangement. The interconnect arrangement includes a respective transmission line for each input. Each transmission line includes a plurality of branches for routing a down-converted RF signal received at the input of that transmission line to the switch of each output. The switch of each output is operable selectively to connect one of the branches of the transmission lines to its output. The interconnect arrangement also includes a plurality of cross-over points at which two of the branches cross over each other.

Although particular embodiments of the invention have been described, it will be appreciated that many modifications/additions and/or substitutions may be made within the scope of the claimed invention.

The invention claimed is:

1. A device for switchably routing down-converted radio frequency (RF) signals from a plurality of inputs to a plurality of outputs, the device comprising:
   a respective switch for each output; and
   an interconnect arrangement comprising:
   a respective transmission line for each input, wherein each transmission line includes a plurality of branches for routing a down-converted RF signal received at the input of that transmission line to the switch of each output, wherein the switch of each output is operable selectively to connect one of the transmission lines to its output; and a plurality of cross-over points at which two of said branches cross over each other.

2. The device of claim 1, wherein the interconnect arrangement has a first axis of symmetry about which a layout of the transmission lines is symmetrical.

3. The device of claim 2, wherein the interconnect arrangement has a second axis of symmetry about which a layout of the transmission lines is symmetrical.

4. The device of claim 3, wherein:

half of the inputs are located on a first side of the interconnect arrangement;

half of the inputs are located on a second side of the interconnect arrangement;

half of the outputs are located on a third side of the interconnect arrangement;

half of the outputs are located on a fourth side of the interconnect arrangement;

wherein the first side is opposite the second side and wherein third side is opposite the fourth side.

5. The device of claim 4, comprising four inputs and four outputs, wherein the branches of each transmission line have six cross-over points.

6. The device of claim 1, wherein each of the inputs is located on a first side of the interconnect arrangement and wherein each of the outputs is located on a second side of the interconnect arrangement, wherein the first side is opposite the second side.

7. The device of claim 6, wherein the inputs and outputs are connected to respective pins of an integrated circuit by connections that do not cross over each other.

8. The device of claim 6, comprising four inputs and four outputs, and wherein the branches of each transmission line have seven cross-over points.

9. The device of claim 1, wherein each transmission line comprises a plurality of branching points.

10. The device of claim 9, wherein each transmission line has two branching points.

11. The device of claim 9, wherein each transmission line has three branching points.

12. The device of claim 1, wherein the interconnect arrangement is provided in a metallization stack on a semiconductor substrate.

13. The device of claim 1, wherein the radio frequency (RF) signals are signals in the frequency range $4 \text{ GHz} \leq f \leq 40 \text{ GHz}$.

14. The device of claim 1, wherein the down-converted radio frequency (RF) signals are in the frequency range $100 \text{ MHz} \leq f \leq 2 \text{ GHz}$.

15. A method of switchably routing down-converted radio frequency (RF) signals, the method comprising:

providing a device according to claim 1;

and operating the switch of at least one output of the device to connect one of the transmission lines of said output.

* * * * *